United States Patent [19]

Willhelm et al.

[11] 4,091,281

[45] May 23, 1978

[54] LIGHT MODULATION SYSTEM

[75] Inventors: Jörg Willhelm, Nauborn; Dietmar Kaul, Solms, both of Germany

[73] Assignee: Ernst Leitz GmbH, Wetzlar, Germany

[21] Appl. No.: 589,563

[22] Filed: Jun. 23, 1975

[30] Foreign Application Priority Data

Jul. 1, 1974 Germany .............................. 2431551

[51] Int. Cl.² ............................................. H01J 39/12
[52] U.S. Cl. .................................. 250/237 G; 356/111; 356/169
[58] Field of Search ........................... 250/237 G, 237; 350/162 R; 356/111, 113, 169, 170, 162 R

[56] References Cited

U.S. PATENT DOCUMENTS

| 3,320,852 | 5/1967 | Parrent, Jr. | 350/162 R |
| 3,768,911 | 10/1973 | Erickson | 250/237 G |
| 3,830,568 | 8/1974 | Allen | 250/237 G |

OTHER PUBLICATIONS

Gerasimov, "Use of Diffraction Gratings for Controlling a Ruling Engine", *Applied Optics*, vol. 6, No. 11, pp. 1861–1865, Nov. 1967.

*Primary Examiner*—Alfred E. Smith
*Assistant Examiner*—David K. Moore
*Attorney, Agent, or Firm*—Gilbert L. Wells

[57] ABSTRACT

A system for one dimensional or multi-dimensional modulation of light proportional to the path, angle or speed, preferably the photoelectric signal analysis of the movement of an object carrier in an interferometer. At least three consecutive diffraction processes take place in the optical path of which one starts from a point and of which the last condenses the light bundles into at least two points. The light bundles are guided in the same direction of diffraction fulfilling the coherence condition where the surfaces of diffraction are spaced relatively far apart and do not use imaging optics.

5 Claims, 5 Drawing Figures

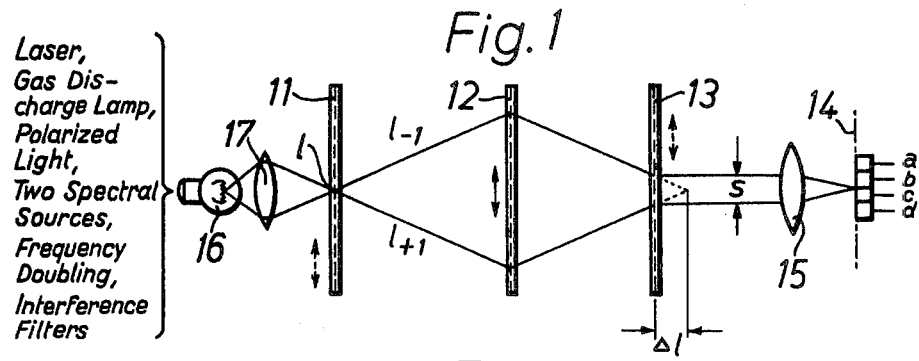
*Fig. 1*
Laser, Gas Discharge Lamp, Polarized Light, Two Spectral Sources, Frequency Doubling, Interference Filters
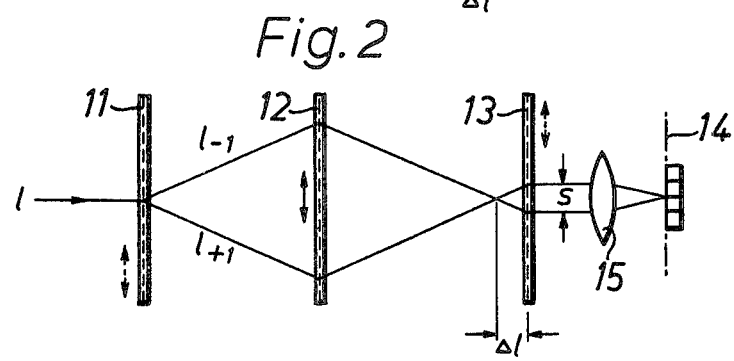
*Fig. 2*
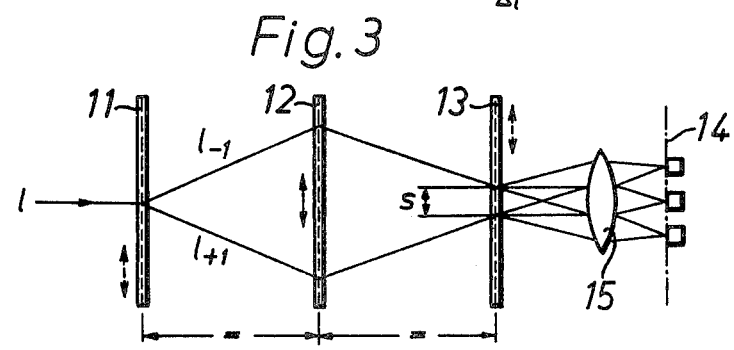
*Fig. 3*
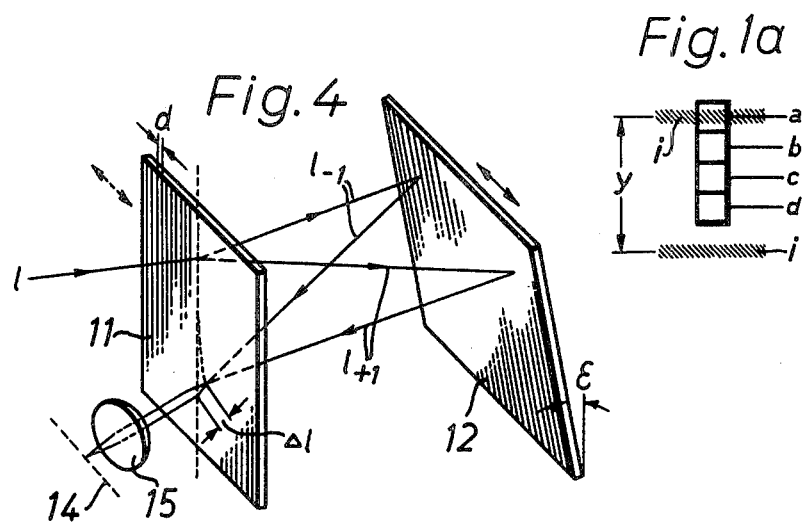
*Fig. 4*
*Fig. 1a*

LIGHT MODULATION SYSTEM

BACKGROUND OF THE INVENTION

The present application relates to a system for modulating light being guided in absence of any imaging optics through consecutive diffraction processes by diffraction surfaces spaced from one another at relatively large distances.

System of such art are used in interferometers to analyze preferably in conjunction with photoelectric detector means the movement of an object carrier of such an interferometer from the one-dimensional or multi-dimensional light modulations proportional to distance or path, to angle or to speed of the object carrier.

The state of the art of interferometers may be ascertained by reference to U.S. Pat. No. 3,591,841, the disclosure of which is incorporated herein.

The state of the art of using optical diffraction systems useful in interferometers may be ascertained by U.S. Pat. No. 3,904,295, the disclosure of which is incorporated herein.

The state of the art of optical systems for analyzing the movement of a movable grating and evaluating the signals therefrom in a push-pull amplifier circuit are disclosed in U.S. Pat. Nos. 2,942,119; 3,198,061; 3,482,107; 3,525,569 and 3,591,841, and the Journal of the Optical Society of America, Volume 53, No. 12, pages 1420 and 1421 (December 1963), the disclosures of which are incorporated herein.

The state of the art of apparatus for generating phase modulated electrical signals in response to a measured angular or linear displacement may be ascertained by reference to U.S. Pat. Nos. 3,768,022; 3,781,119; and 3,833,299, the disclosures of which are incorporated herein.

The disclosure of U.S. Pat. No. 3,320,852 is incorporated herein to further explain the combination of objective 15 of the present invention as shown in FIG. 1, with optical diffraction grating 13 and the projection of images onto plane 14. This patent also shows the utility of the apparatus of the present invention for producing a plurality of images of a single object.

For purposes of modulation, it is known from the art to pass light through at least three consecutive diffraction processes mentioned above in the optical path of light. The first of which starts from one point of the first one of at least three grating structures utilized to diffract light and effects the splitting of the light into at least two diffraction orders impinging on the second one of such structures having a grating constant that ascertains the condensation of the diffracted light into one point on the third grating structure.

Such light being guided always into the same direction of diffraction is fulfilling the coherence condition. The rays or beams of light describing the diffracted light waves encompass a polygon and the spacing between the first and the second grating structure and between the last and the penultimate one as well as the grating constants between the first and the last one of such grating structures are equal. It is stated that no imaging takes place between diffractions.

Multiple consecutive diffractions are known from instruments described among others by Gerasimow & Rassudova in:

Optics and Spectroscopy 14, pages 215–219
Optics and Spectroscopy 14, pages 296–297
Optics and Spectroscopy 19, pages 152–156
Applied Optics, Vol. 6, No. 11 (Nov. 1967) pages 1861–1865
Optical Technology, Vol. 38, No. 10 (Oct. 1971) pages 588–590 and further by reference to the publication of: Weinberg in the Journal of Sci. Inst., Vol. 36, (May 1959) at page 228; the disclosures of which are incorporated herein.

Having in mind the conditions for spacing and diffraction as mentioned above, these grating structures are useful for various cases of transmission and reflection.

These systems of the art described operate in principle upon the fact that relative movement between the gratings in a direction transverse to the rulings results in a change in the direction of light output from the gratings. The directional change can be visually observed as a transverse shift in moire fringe position and when appropriate optics are employed in the light entering or emerging such systems the change in light output directions can be translated into a generally cyclic fluctuation in the intensity of light transmitted. Photoelectrical means are commonly used to convert the varying light intensity to a comparably varying electrical signal which is employed to trigger electronic counting means in order to indicate the amount of relative movement between the grating elements.

Such systems provide light modulations in various directions, and depending on the diffraction orders of these modulations, are converted into electrical push-pull signals by means of a receiver detector system. However, $(2k + 1)\cdot\pi/2$ phase shifted signals are lacking in the systems of the known art to generate rotational fields required for detecting in a simple manner the relative directions of motion.

SUMMARY OF THE INVENTION

Having in mind the limitations of the prior art, the present application has as an object a system allowing the generation of all the phase-shifted signals required for the rotational field by making use of known grating arrays, so that simple signal analysis is feasible.

According to the present invention the problem for systems for the initially mentioned kind is solved by gratings and/or the spacings between them selected to cause light beams emerging from one point at a grating being diffracted into at least two diffraction orders and being condensed by a penultimate grating into at least two points at a last grating.

Such a splitting and condensing of light beams is achieved by providing the gratings with constants (coefficients) which differ from one to another or by selecting different spacings between gratings.

The present invention also contemplates beam splitting when the planes of at least two gratings subtend an angle whereby the second grating is of reflection type.

Light modulations are obtained by moving either the penultimate grating or those representing the first and the last one by coupling them with the object to be measured in a manner known per se by the state of the art.

Subsequently to the last grating the condensed beams interfere and due to the movement of the penultimate grating or the first and the last one respectively interference fringes occur that are incident upon photoelectric receiver means and thereby generating electric rotational field signals. Evaluating means, as for instance disclosed in FIG. 14 of U.S. Pat. No. 3,768,911, producing from said signals an output signal indicative of the property of movement of the object to be measured.

The special advantage of the new system of the present invention consists in the feasibility of simultaneously obtaining all the required signals needed to determine an electrical rotational field from a single grating field.

BRIEF DESCRIPTION OF THE DRAWINGS

The present invention is best described by reference to the embodiments shown in the attached drawings, wherein:

FIG. 1 is a schematic plan view of the novel system of the present invention using three optical diffraction gratings for transmitting light where the last grating in series is spaced to the left of the focal joining point;

FIG. 1a is a detailed showing of a photoelectric receiver-detector system useful with the system of FIG. 1;

FIG. 2 is a schematic plan view of the novel system of the present invention using three optical diffraction gratings for transmitting light where the last grating in series is spaced to the right of the joining point;

FIG. 3 is a schematic plan view of the novel system of the present invention using three optical diffraction gratings for transmitting light where the gratings differ in their grating constants; and FIG. 4 is a schematic plan view of the novel system of the present invention using two optical diffraction gratings with three diffractions using reflected light where the gratings are slanted towards each other.

DESCRIPTION OF THE PREFERRED EMBODIMENTS

As shown in FIGS. 1 and 2, light 1 emanting from light source 16 and objective 17 and diffracted into different directions ± 1 by a grating 11 is deflected by a grating 12 and again combined by interference at a grating 13. When all the grating constants are equal, grating 13 is shifted by an amount Δ1 along the optical axis.

The interfering beam path subsequent to grating 13 is spaced by an amount $s$ and interference fringes of the same inclination occur in the focal point 14 of optics 15. Phase-shifted signals are obtained when a photoelectric detector-receiver system (FIG. 1a) is mounted in plane 14. The interference fringes are incident in varying manner upon the individual system surfaces a, b, c, d of FIG. 1a and thereby generate electric rotational field signals.

Splitting of the beams causes a local brightness modulation of the images of the light sources in the rear focal plane.

FIG. 3 shows a system similar to the above discussed one, wherein gratings 11, 12 and 13 are spaced the same distance apart, while the grating constants $d_{11}$ and $d_{13}$ or $d_{12}$ differ from one another so that the desired beam splitting is achieved at a distance or separation $s$ at the last grating.

Aside from the phase-shifted signals, light fluxes from other diffraction orders may also be measured in the detector-receiver plane 14, at different distances from the optical axis as indicated in FIG. 3.

FIG. 4 shows an embodiment with reflected light. The different spacings between the gratings in this instance are achieved by tilting the plane of grating 12 by an angle $\epsilon$ with respect to the plane of grating 11.

One must also observe that the desired beam splitting by the separation $s$ may also be obtained in ways different from the ones shown herein. For instance, optical wedges between parallel gratings or radial gratings as index carriers with locally different grating constants are applicable.

The grating constants $d_{11}$, $d_{13}$ and $d_{12}$ may be suitably varied between about $2\mu$ and $100\mu$.

The spacing $\Delta 1$ may be varied between about $2\mu$ and 10 mm and is dependent on the grating constants, the distance between the gratings and the spacing wanted of the interference fringes.

In combination with the focal length $f$ of lens 15, the spacing $y$ of the interference fringes and the wave length $\lambda$ of the light used the spacing $s$ results from the formula:

$$s = \lambda \cdot f/y.$$

The angle $\epsilon$ may be suitably varied between about 1' and 30°.

We claim:

1. In a system for measuring the property of movement of a light dispersing object in at least one coordinate direction, said object generating light modulations by utilizing at least three consecutive diffraction processes for splitting a beam of light into at least two diffraction orders and for condensing the latter ones; photoelectric detector means producing from said light modulated electrical signals shifted in phase and evaluating means producing from said signals an output signal indicative of the property of movement, the improvement comprising:
   (a) a light source having an optical axis and generating light beams from a given point on said optical axis;
   (b) at least two diffraction gratings spaced along said optical axis for causing said at least three consecutive diffraction processes, at least one of said gratings defining said light dispersing object and another one of said gratings being spaced for modulating said light beams and condensing them by diffraction into at least two points for further diffraction; and
   (c) optical means concentrating said further diffracted light beams onto said photoelectric detector means for causing the latter one to generate electric rotational field signals indicative of said property of movement.

2. The system of claim 1, wherein said diffraction gratings comprise first, second and third gratings in series along said optical axis, the grating constants of the first and the third grating being the same, the spacing between the first and second grating having a given distance and the spacing between the second grating and the third grating being less than said given distance.

3. The system of claim 1, wherein said diffraction gratings comprise first, second and third gratings in series along said optical axis, the grating constants of the first and the third grating being the same, the spacing between the first and second grating having a given distance and the spacing between the second grating and the third grating being greater than said given distance.

4. The system of claim 1, wherein said diffraction gratings comprise first, second and third gratings in series along said optical axis, the spacing between said first and second gratings being the same as the spacing between said second and third gratings, said gratings having different grating constants.

5. The system of claim 1, wherein said diffraction gratings comprise first and second gratings in series along said optical axis, said light beams passing through said first grating and reflecting back from said second grating to said first grating, said first and second gratings having planes subtending an angle between them.

* * * * *